United States Patent
Weiss

(10) Patent No.: US 6,681,413 B2
(45) Date of Patent: Jan. 27, 2004

(54) PORTABLE RESTROOM HAVING A REMOVABLE WASTE STORAGE CONTAINER AND METHOD THEREFOR

(76) Inventor: Paul E. Weiss, 215 N. Power Rd., #228, Mesa, AZ (US) 85205

( * ) Notice: Subject to any disclaimer, the term of this patent is extended or adjusted under 35 U.S.C. 154(b) by 0 days.

(21) Appl. No.: 10/091,633

(22) Filed: Mar. 5, 2002

(65) Prior Publication Data
US 2003/0167562 A1 Sep. 11, 2003

(51) Int. Cl.[7] ............................................. A41K 11/04
(52) U.S. Cl. .................... 4/476; 4/470; 4/477; 4/449; 4/462; 4/458
(58) Field of Search ....................... 4/476, 470, 477, 4/449, 462, 662, 458

(56) References Cited

U.S. PATENT DOCUMENTS

| | | | | |
|---|---|---|---|---|
| 2,999,247 A | * | 9/1961 | Kulka | 4/462 |
| 3,601,821 A | * | 8/1971 | Corsiglia | 4/300 |
| 3,629,875 A | * | 12/1971 | Dow et al. | 4/599 |
| 4,751,753 A | * | 6/1988 | Sargent et al. | 4/321 |
| 5,093,941 A | * | 3/1992 | Muller | 4/479 |
| 5,251,342 A | * | 10/1993 | Sansom et al. | 4/462 |
| 5,671,487 A | * | 9/1997 | Chen | 4/477 |
| 5,682,622 A | * | 11/1997 | Tagg | 4/449 |
| 5,683,067 A | * | 11/1997 | Slykas | 248/314 |
| 5,913,610 A | * | 6/1999 | Duck | 4/321 |
| 5,937,452 A | * | 8/1999 | Brewer | 4/460 |
| 6,393,627 B1 | * | 5/2002 | Avila | 4/449 |
| 6,427,256 B1 | * | 8/2002 | Mullett et al. | 4/476 |

* cited by examiner

*Primary Examiner*—Gene Mancene
*Assistant Examiner*—Azadeh Kokabi
(74) *Attorney, Agent, or Firm*—Jeffrey D. Moy; Harry M. Weiss; Weiss, Moy & Harris, P.C.

(57) ABSTRACT

A portable restroom facility has a housing. The housing has a door opening for entering and exiting the housing. A removable waste storage container is stored within the housing for holding bodily waste. When the removable waste storage container is full or partially full, the removable waste storage container can be removed and a new clean removable waste storage container can be inserted into the housing. Thus, a waste drainage truck does not need to visit each facility and drain each portable restroom facility.

11 Claims, 2 Drawing Sheets

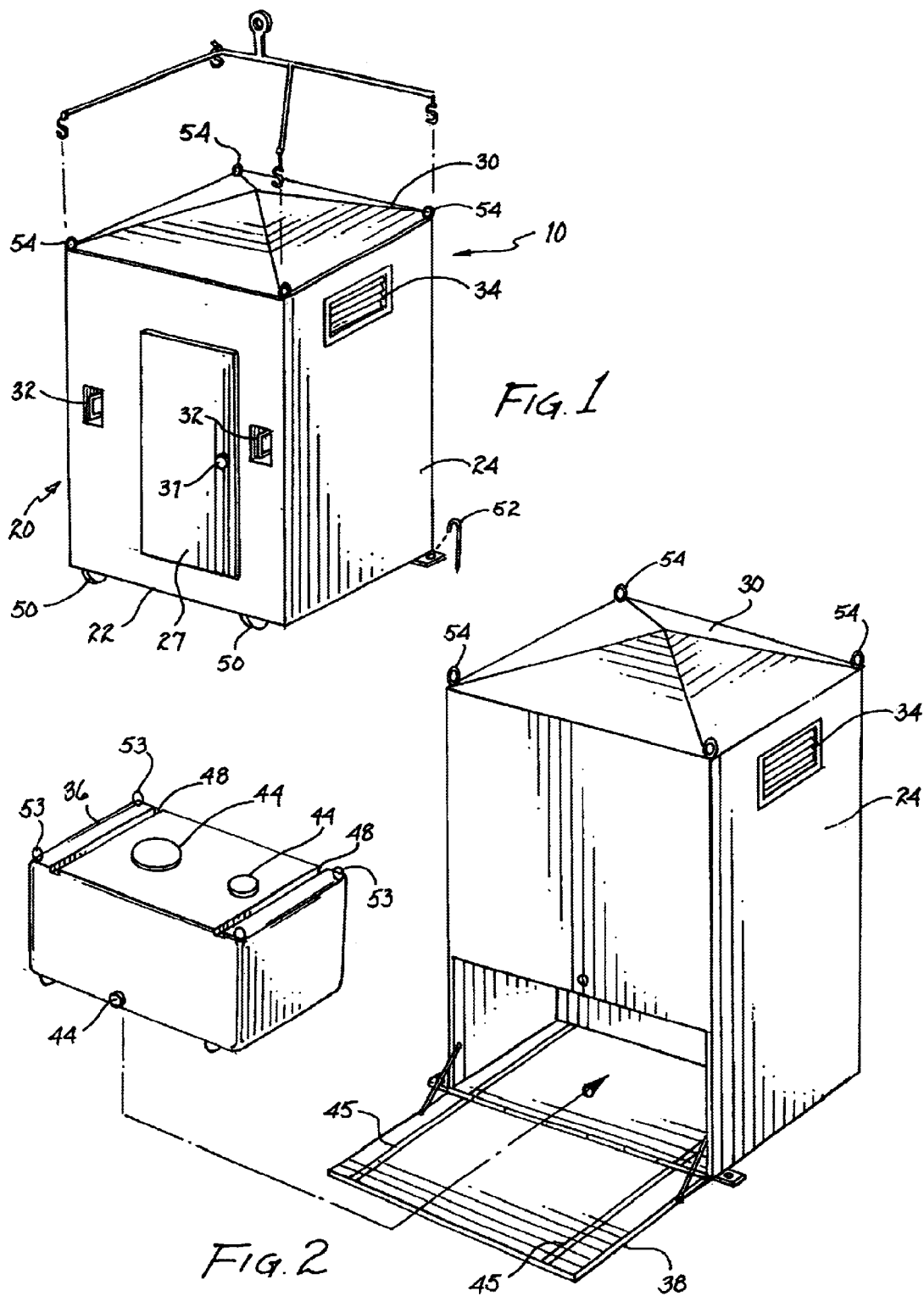

PORTABLE RESTROOM HAVING A REMOVABLE WASTE STORAGE CONTAINER AND METHOD THEREFOR

BACKGROUND OF THE INVENTION

1. Field of the Invention

This invention relates to portable restrooms and, more specifically, to an improved portable restroom having a removable waste storage container.

2. Description of the Prior Art

At many construction sites as well as outdoor events such as fairs, concerts and sporting activities, there are a severe lack of restroom facilities available to be used. Because of this, many construction sites and outdoor events have portable restroom facilities installed. Unfortunately, these portable restroom facilities are hard to transport and move around.

Presently, portable restroom facilities are comprise of a small housing which has a single door to enter the housing. Inside the housing, a permanent storage tank is installed. The storage tank is used to hold waste products. The storage tank will have an opening at the top on which a toilet seat is positioned. A small urinal may also be positioned on one of the side walls. Some tubing is used to connect the urinal to the storage tank.

For sanitary and health reasons, the waste by-products in the portable restroom facilities need to be drained on a fairly regular basis. In order to remove the waste by-products stored in the permanent storage tank, a drainage truck must visit each portable restroom facility. The drainage truck must couple a tubing from the truck to a drainage opening in the storage tank. The truck will then drain the waste by-products from the storage tank in a similar manner as a drainage truck drains the contents from a septic tank. As one can see, the drainage process is a time consuming and very dirty and unsanitary process.

Therefore, a need existed to provide an improved portable restroom facility. The improved portable restroom facility will have a removable waste storage container. The removable waste storage container will overcome the above mentioned problems found in prior art portable restroom facilities.

SUMMARY OF THE INVENTION

In accordance with one embodiment of the present invention, it is an object of the present invention to provide an improved portable restroom facility.

It is another object of the present invention to provide an improved portable restroom facility that will have a removable waste storage container thereby overcoming the many problems found in prior art portable restroom facilities.

BRIEF DESCRIPTION OF THE EMBODIMENTS

In accordance with one embodiment of the present invention a portable restroom facility is disclosed. The portable restroom facility has a housing. The housing has a door opening for entering and exiting the housing. A removable waste storage container is stored within the housing for holding bodily waste.

In accordance with another embodiment of the present invention, a portable restroom facility has a housing. The housing has a front wall having a door opening for entering and exiting the housing. A pair of side walls are coupled to the front wall. A rear wall is coupled to the side walls. A roof is coupled to the front wall, the pair of side walls and the rear wall. A floor is coupled to the front wall, the pair of side walls and the rear wall. A door is pivotally coupled to the door opening. A covering is provided for storing the removable waste storage container within the housing. The covering will have a cover opening to allow waste to be disposed of through the cover. A removable waste storage container is stored within the housing for holding bodily waste. A container opening is provided in the housing for inserting and removing the removable waste storage container. A container opening door is pivotally coupled to the container opening.

The foregoing and other objects, features, and advantages of the invention will be apparent from the following, more particular, description of the preferred embodiments of the invention, as illustrated in the accompanying drawing.

BRIEF DESCRIPTION OF THE DRAWINGS

The novel features believed characteristic of the invention are set forth in the appended claims. The invention itself, as well as a preferred mode of use, and advantages thereof, will best be understood by reference to the following detailed description of illustrated embodiments when read in conjunction with the accompanying drawings, wherein like reference numerals and symbols represent like elements.

FIG. 1 is an elevated perspective view of the improved portable restroom facility having a removable waste storage container.

FIG. 2 is an elevated rear view of the improved portable restroom facility depicted in FIG. 1.

DETAILED DESCRIPTION OF THE PREFERRED EMBODIMENT

Figure 3:
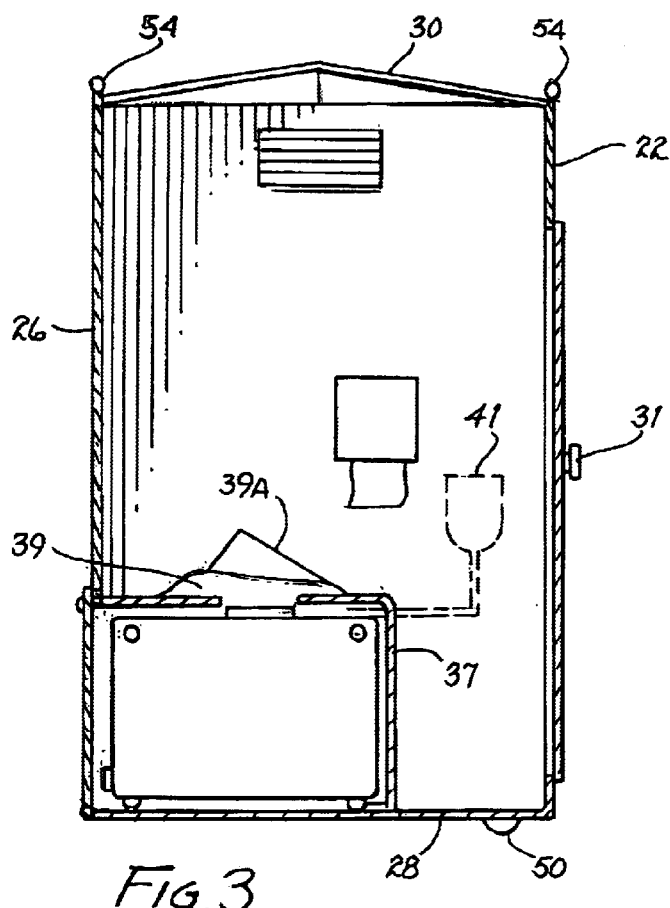
FIG. 3 is a cross-sectional side view of the improved portable restroom facility depicted in FIG. 1.
Figure 4:
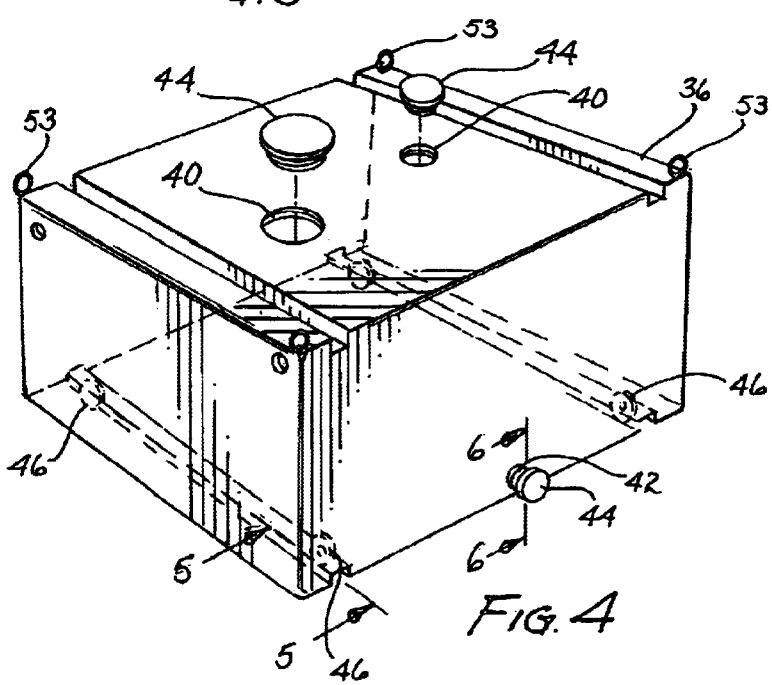
FIG. 4 is an elevated perspective view of the removable waste storage container used in the improved portable restroom facility depicted in FIG. 1.
Figure 6:
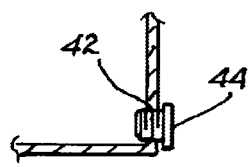
FIG. 6 is a cross-sectional view taken along lines 6—6 of FIG. 4 of the drainage plug used with the waste storage container.
Figure 5:
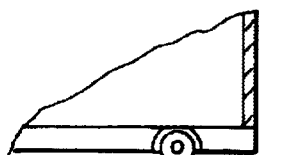
FIG. 5 is a cross-sectional view taken along lines 5—5 of FIG. 4 of the transport mechanism used with the waste storage container.

Referring to FIGS. 1–6, an improved portable restroom facility 10 (hereinafter portable restroom 10) is disclosed. The portable restroom 10 has a housing 20. The housing may be made out of a plurality of different material. However, a lightweight and sturdy material is generally used. Materials such as a plastic or fiberglass are generally used. However, this should not be seen as to limit the scope of the present invention.

The housing 20 will have a front wall 22, a pair of side walls 24, and a rear wall 26. A floor 28 will be coupled to a bottom section of the front wall 22, the pair of side walls 24, and the rear wall 26. A roof 30 will be coupled to a top section of the front wall 22, the pair of side walls 24, and the rear wall 26.

The front wall 22 will have an opening centrally located thereon. The opening will run from the bottom section of the front wall 22 up to a top section thereon. The opening is used to allow individuals to enter and exit the portable restroom 10. A door 27 will be pivotally coupled to the opening. The door 27 will have a knob 31 which will allow one to open and close the door 27. A locking device may also be used to ensure privacy when one enters the portable restroom 10. The front wall 22 will further have a pair of handles 32. The handles 32 are located on each side of the front wall 22. The handles 32 are used to move the portable restroom 10 to a desired location once the portable restroom is off loaded from a truck and positioned on the ground. In the embodiment depicted in FIG. 1, the handles 32 are slightly recessed in the front wall 22. The handles 32 are thus slightly hidden and will not protrude out. It should be noted that the handles 32 may also be located on the rear wall 26. If the handles 32 are located on the rear wall 26, one may be more able to move the portable restroom 10 if the portable restroom 10 has the removable waste storage container 36 already installed.

One or more air vents 34 are located on the portable restroom 10. In the embodiment depicted in the Figures, the air vent 34 are located on the side walls 24. However, this should not be seen as to limit the scope of the present invention. The air vent 34 may be located on any of the walls or on the roof 30 of the portable restroom 10. The air vents 34 will allow fresh outside air to circulate within the portable restroom.

The rear wall 26 has a door 38. The door 38 is located at a bottom section of the rear wall 26. The door 38 will be pivotally coupled to the rear wall 26. In the embodiment depicted in FIG. 2, the door 38 folds in a downward direction. However, this should not be seen as to limit the scope of the present invention. In an alternative embodiment, the door 38 will open in an upward direction.

Behind the door 38 is a removable waste storage container 36. The removable waste storage container 36 is used to store bodily waste. The removable waste storage container 36 may come in a variety of sizes and shapes. In the embodiment depicted in the Figures, the removable waste storage container 36 is shaped as a hollow rectangular block. However, this should not be seen as to limit the scope of the present invention. The removable waste storage container 36 is generally made out of a light weight but sturdy material. Materials such as plastic or fiberglass are generally used. However, the listing of these materials should not be seen as to limit the scope of the present invention.

The removable waste storage container 36 is different from the prior art. When the removable waste storage container 36 is full or nearly full of bodily waste, the removable waste storage container 36 can be removed and a new clean removable waste storage container 36 can be inserted into the housing 20. Thus, a waste drainage truck does not need to visit each facility and drain each portable restroom 10. Instead, the removable waste storage container 36 can be removed and transported to a disposal unit. The shape of the removable waste storage container 36 will allow a plurality of removable waste storage containers 36 to be stack on top of one another for easy transport to a disposal unit.

The removable waste storage container 36 is placed underneath a housing 37. The housing 37 will have an opening 39 located at a top section thereof. A toilet seat 39A is generally positioned above the opening 39.

The removable waste storage container 36 will have one or more openings 40 located on a top surface thereof. The openings 40 are used to dispose bodily waste into the removable waste storage container 36. One of the openings 40 is positioned directly underneath the opening 39 of the housing 37. This opening 40 is used for a seated toilet while another opening 40 is coupled to a urinal 41 which may be coupled to an interior section of the side wall 24. Another opening 42 is located at a bottom section of the removable waste storage container 36. The opening 42 is used to drain the bodily waste stored in the removable waste storage container 36.

Each of the openings 40 and 42 will have a cover 44. The cover is used to prevent the bodily waste from coming out of the openings 40 and 42 when moving a full or partial full removable waste storage container 36. In the embodiment depicted in the Figures, the cover 44 are threaded covers which will engage threads located in the interior of the openings 40 and 42. However, this should not be seen as to limit the scope of the present invention. Other types of covers 44 like plugs and the like could be used.

The removable waste storage container 36 will have two or more wheels 46 coupled to a bottom section thereof. The wheels 46 are used to easily transport the removable waste storage container 36 into and out of the housing 20. The wheels 46 will travel within a pair of tracks 45. The tracks 45 are formed on the floor 28 and the interior of the door 38. The tracks will allow one to easily move the removable waste storage container 36 from the portable restroom 10. To further aid in the moving of the removable waste storage container 36, the floor 28 may be slightly angled in a downward manner. This will allow the removable waste storage container 36 to more easily be rolled out of the portable restroom 10.

On the top section of the removable waste storage container 36 is another pair of tracks 48. The tracks 48 allow the wheels 46 to slide within the tracks 48 when the removable waste storage containers 36 are stack on top of one another. A plurality of hook members 53 are also located on the top section of the removable waste storage container 36. The hook members 53 are used to allow a crane to pick up and move the removable waste storage container 36.

On a bottom section of the floor 28 is a pair of wheels 50. The wheels 50 are used to transport and move the portable restroom 10 when the portable restroom 10 is placed on the ground. The wheels may be positioned in the front or in the rear of the portable restroom 10. In general, the wheels 50 will be positioned on the same side of the portable restroom as the handles 32 to allow for the easy movement of the portable restroom 10. Also coupled on the floor 28 is a pair of anchors 52. The anchors 52 are generally a spike member which may be inserted into the ground to anchor the portable restroom 10 in position. The anchors 52 will be positioned on the opposite side the floor 28 from the wheels 50.

The roof 30 may have a plurality of ring members 54. The ring members 54 would be attached to a top section of the roof 30. The ring members 54 are used to pick up and transport the portable restroom 10 from a truck to the ground. In the embodiment depicted in the Figures, the ring members 54 are positioned on each corner of the roof 30. However, this is just one embodiment and should not be seen as to limit the scope of the present invention.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A portable restroom facility comprising:
 a housing having a door for entering and exiting the housing; and
 a removable waste storage container stored within the housing for holding bodily waste;

a covering for storing the removable waste storage container within the housing wherein the covering will have a cover opening to allow the bodily waste to be disposed of through the cover opening and into the removable waste storage container;

wheels coupled to a bottom section of the removable waste storage container for moving the removable waste storage container; and tracks located on a top portion of the removable waste storage container for allowing the wheels to be placed inside the tracks when the removable waste storage container is placed on top of another waste storage container.

2. A portable restroom facility in accordance with claim 1 wherein the housing comprises:

a front wall having the door opening for entering and exiting the housing;

a pair of side walls coupled to the front wall;

a rear wall coupled to the side walls;

a roof coupled to the front wall, the pair of side walls and the rear wall;

a floor coupled to the front wall, the pair of side walls and the rear wall; and a door pivotally coupled to the door opening.

3. A portable restroom facility in accordance with claim 2 further comprising at least one ring coupled to the roof for allowing a sling to be coupled to the ring to move the portable restroom facility.

4. A portable restroom facility in accordance with claim 1 further at least one vent coupled to the housing for allowing air to circulate within the housing.

5. A portable restroom facility in accordance with claim 1 further comprising a pair of handles coupled to the housing for moving the portable restroom facility.

6. A portable restroom facility in accordance with claim 1 further comprising:

a container opening in the housing for inserting and removing the removable waste storage container; and a container opening door pivotally coupled to the container opening.

7. A portable restroom facility in accordance with claim 1 wherein the removable waste storage container comprises:

a first waste opening located on a top section of the removable waste storage container wherein the first waste opening is aligned with the cover opening when the removable waste storage container is positioned within the covering; and a second waste opening located on a bottom section of the removable waste storage container for draining the removable waste storage container.

8. A portable restroom facility in accordance with claim 7 wherein the container further comprises a third waste opening located on the top section of the removable waste storage container for coupling a urinal to the removable waste storage container.

9. A portable restroom facility in accordance with claim 7 wherein the container further comprises covers coupled to the first waste opening and the second waste opening.

10. A portable restroom facility in accordance with claim 1 further comprising wheels coupled to the bottom section of the housing for moving the portable restroom facilities.

11. A portable restroom facility in accordance with claim 1 further comprising an anchor coupled to the bottom section of the housing for coupling the portable restroom facilities to the ground.

* * * * *